US009670291B2

(12) United States Patent
Marechal et al.

(10) Patent No.: US 9,670,291 B2
(45) Date of Patent: Jun. 6, 2017

(54) FUNCTIONALIZED DIENE ELASTOMER, AND RUBBER COMPOSITION CONTAINING SAME

(75) Inventors: Jean-Marc Marechal, Chamalieres (FR); Stéphanie De Landtsheer, Moscow (RU); Jean-Michel Favrot, Cournon-D'Auvergne (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 769 days.

(21) Appl. No.: 13/500,942

(22) PCT Filed: Oct. 7, 2010

(86) PCT No.: PCT/EP2010/065030
§ 371 (c)(1),
(2), (4) Date: Jun. 18, 2012

(87) PCT Pub. No.: WO2011/042507
PCT Pub. Date: Apr. 14, 2011

(65) Prior Publication Data
US 2012/0252928 A1    Oct. 4, 2012

(30) Foreign Application Priority Data
Oct. 8, 2009  (FR) ..................... 09 57030

(51) Int. Cl.
C08F 236/10    (2006.01)
C08C 19/44     (2006.01)
B60C 1/00      (2006.01)
C08C 19/25     (2006.01)
C08L 19/00     (2006.01)
C08L 15/00     (2006.01)

(52) U.S. Cl.
CPC ............ *C08C 19/44* (2013.01); *B60C 1/0016* (2013.04); *C08C 19/25* (2013.01); *C08L 19/006* (2013.01); *C08L 15/00* (2013.01)

(58) Field of Classification Search
CPC C08F 297/044; C08F 297/023; C08F 236/06; C08F 236/08; C08F 239/00; C08F 2/38; C08L 83/10; B60C 1/0016
USPC .................. 526/335, 340; 525/479
See application file for complete search history.

(56) References Cited

U.S. PATENT DOCUMENTS

| 5,811,479 | A  | 9/1998  | Labauze |
| 6,228,908 | B1 | 5/2001  | Takeichi et al. |
| 6,774,255 | B1 | 8/2004  | Tardivat et al. |
| 2001/0031795 | A1 | 10/2001 | Hodge |
| 2003/0055140 | A1 | 3/2003  | Hodge |
| 2004/0051210 | A1 | 3/2004  | Tardivat et al. |
| 2004/0254301 | A1 | 12/2004 | Tsukimawashi et al. |
| 2005/0016650 | A1 | 1/2005  | Durel et al. |
| 2005/0016651 | A1 | 1/2005  | Durel et al. |
| 2010/0317794 | A1 | 12/2010 | Tanaka et al. |

FOREIGN PATENT DOCUMENTS

| EP | 0 299 074 A1 | 1/1989 |
| EP | 0 447 066 A1 | 9/1991 |
| EP | 0 778 311 A1 | 6/1997 |
| EP | 0 786 493 A1 | 7/1997 |
| EP | 1 122 281 A1 | 8/2001 |
| EP | 2 070 952 A1 | 6/2009 |
| EP | 2 098 541 A1 | 9/2009 |
| RU | 2320683 C2 | 3/2008 |
| WO | WO 96/37547 A1 | 11/1996 |
| WO | WO 98/50462 A1 | 11/1998 |
| WO | WO 02/10269 A  | 2/2002 |
| WO | WO 02/30939 A1 | 4/2002 |
| WO | WO 02/31041 A1 | 4/2002 |
| WO | WO 03/002648 A1 | 1/2003 |
| WO | WO 03/002649 A1 | 1/2003 |
| WO | WO 2005-087859 A1 | 9/2005 |
| WO | WO 2006/061064 A1 | 6/2006 |
| WO | WO 2006/069792 A1 | 7/2006 |
| WO | WO 2006/069793 A1 | 7/2006 |
| WO | WO 2006/012553 A1 | 11/2006 |
| WO | WO 2006/125532 A1 | 11/2006 |
| WO | WO 2006/125534 A1 | 11/2006 |
| WO | WO 2007/017060 A1 | 2/2007 |
| WO | WO 2008/003434 A1 | 1/2008 |
| WO | WO 2008/003435 A1 | 1/2008 |
| WO | 2009 077839  * | 6/2009 |
| WO | WO 2009/077837 A1 | 6/2009 |

OTHER PUBLICATIONS

Odian (Principles of Polymerization, 2nd Ed., John Wiley & Sons, 1981, pp. 377-378).*
International Search Report (PCT/ISA/210) issued on Jan. 28, 2011, by European Patent Office as the International Searching Authority for International Application No. PCTEP2010/065030.
French Search Report issued on May 20, 2010, by French Patent Office for French Application No. 0957030 (with English language translation of category of cited documents).
David H. Beebe, "Structure of 3,4-(cis-1,4)Trans-1,4-Ployisoprene by $^{13}$C n.m.r.", Polymer, Feb. 1978, vol. 19, pp. 231-233.
J.H. Bradbury et al., "Comparison of Methods of Calculation of $^{13}$C-NMR Chemical Shifts of Diene Polymers With Applications to Isomerized Natureal Rubber", Journal of Polymer Science: Part A: Polymer Chemistry, vol. 26, 1988, pp. 615-626.
Decision to Grant Patent for Invention for RU2012118621 dated Jun. 26, 2015.

* cited by examiner

Primary Examiner — Kuo-Liang Peng
(74) Attorney, Agent, or Firm — Dickinson Wright PLLC

(57) ABSTRACT

The present invention relates to a specific functionalized diene elastomer. This functionalized elastomer exhibits a reduced cold flow without, however, damaging the properties of a reinforced rubber composition in which it is present, in particular the processing properties and the hysteresis properties. This functionalized diene elastomer carries, at the chain end, a silanol functional group or a polysiloxane block having a silanol end and is partially coupled by or star-branched by tin.

16 Claims, No Drawings

FUNCTIONALIZED DIENE ELASTOMER, AND RUBBER COMPOSITION CONTAINING SAME

The present invention relates to a specific functionalized diene elastomer. This functionalized elastomer exhibits a reduced cold flow without, however, damaging the properties of a reinforced rubber composition in which it is present, in particular its hysteresis properties.

Now that savings in fuel and the need to protect the environment have become a priority, it is desirable to produce polymers having good mechanical properties and a hysteresis which is as low as possible in order to be able to employ them in the form of rubber compositions which can be used in the manufacture of various semifinished products involved in the composition of tyre covers, such as, for example, underlayers, bonding rubbers between rubbers of different natures, coating rubbers for metal or textile reinforcing elements, side wall rubbers or treads, and to obtain tyres with improved properties, in particular having a reduced rolling resistance.

The reduction in the hysteresis of the mixtures is an ongoing objective which must, however, be carried out while retaining the ability of the mixtures to be processed.

Numerous solutions have already been tried out in order to achieve the objective of fall in hysteresis. Mention may in particular be made of the modifying of the structure of the diene polymers and copolymers at the end of polymerization by means of functionalization, coupling or star-branching agents, with the aim of obtaining good interaction between the polymer thus modified and the filler, whether carbon black or a reinforcing inorganic filler.

In the context of mixtures comprising a reinforcing inorganic filler, provision has in particular been made to use diene polymers functionalized by alkoxysilane derivatives. Mention may be made, by way of illustration of this prior art relating to reinforcing inorganic fillers, for example, of U.S. Pat. No. 5,066,721, which describes a rubber composition comprising a diene polymer functionalized by an alkoxysilane having at least one nonhydrolysable alkoxyl residue as a mixture with silica. Mention may also be made of Patent Applications EP-A-0 299 074 and EP-A-0 447 066, which describe functionalized polymers comprising alkoxysilane functional groups. These functionalized polymers have been described in the prior art as effective in reducing the hysteresis and improving the abrasion resistance; however, their properties remain insufficient to allow the use of these polymers in compositions intended to form tyre treads. Furthermore, the formulation of these polymers presents problems of development of the macrostructures during the removal of the polymerization solvent, which results in a severe decline in the potentially advantageous properties. In addition, this development is only very slightly controllable.

Patent application EP 0 778 311, EP 0 786 493 or WO 9850462 has described a reinforced rubber composition based on a diene polymer functionalized at the chain end by a silanol functional group or a polysiloxane block having at least one silanol end. This functionalized elastomer is not subject to disadvantageous structural modifications in the context of the subsequent use thereof in tyres. In addition, the composition comprising such a functionalized elastomer exhibits good hysteresis properties.

More recently, Patent Application WO 2009/077837 describes elastomers functionalized at one chain end by a silanol functional group or a polysiloxane block having at least one silanol end and functionalized at the other chain end. These elastomers are also described as being able to be combined with star-branched elastomers, in particular star-branched by silicon. However, the combinations illustrated result in a reinforced rubber composition for which the compromise in processing and hysteresis properties is not satisfactory for application in tyres.

When use is made of an elastomer functionalized at the chain end by a silanol functional group or a polysiloxane block having at least one silanol end as a mixture with silica as reinforcing filler, the mixture is observed to stiffen. This stiffening, which is reflected by a deterioration in the manufacture and/or processability of the composition, results in a fall in the productive output. In order to overcome this stiffening of the mixtures, it is possible in particular to readjust the Mooney plasticity of the elastomer in order to obtain, in fine, a mixture with acceptable processing properties, in particular for the purpose of the extrusion of the mixture in order to manufacture semifinished products intended for tyres, such as treads, for example. However, the fall in the Mooney plasticity of the elastomer is not without effect on the properties of the elastomer and results more particularly in a tendency for the elastomer to exhibit a high cold flow. This cold flow reflects the ability of the elastomers to flow under a load equal to their own weight, in particular when samples or bales of these elastomers are stacked on top of one another in storage crates. Thus, the cold flow can be highly disadvantageous during the transportation and storage of the elastomers.

The aim of the present invention is to provide an elastomer which confers, on a reinforced rubber composition, good properties of hysteresis and of processing with a view to application in tyres, while exhibiting a reduced cold flow from the perspective of a better behaviour during the storage of the rubber. This results in a minimizing of the risk of the samples or bales of elastomers overflowing the crates, resulting in collapse of the latter and conflicting with the extraction of the elastomers.

The Inventors have just discovered, during their research studies, that a functionalized diene elastomer composed of a diene elastomer functionalized at one chain end only by a silanol functional group or a polysiloxane block having a silanol end and, in a certain proportion, of a diene elastomer coupled by or star-branched by tin confers, on a rubber composition in which it is present, rubber properties and in particular hysteresis and processing properties which are entirely satisfactory and acceptable for use in tyres, while exhibiting a significantly improved resistance to cold flow. The rubber properties of this composition are thus maintained at a level equivalent to those of compositions of the prior art based on a single elastomer functionalized at the chain end by a silanol functional group. This is all the more unexpected as an increase in the hysteresis and in the processing of the rubber composition might have been expected for the benefit of the significant increase in the resistance to cold flow observed for the functionalized diene elastomer present in the composition.

The invention thus relates to a diene elastomer functionalized at the chain end by a silanol functional group or a polysiloxane block having a silanol end and, in a certain proportion, a diene elastomer coupled by or star-branched by tin.

Another subject-matter of the invention is a rubber composition reinforced by at least one inorganic filler, such as silica, comprising such a functionalized diene elastomer.

Another subject-matter of the invention is a tyre which incorporates, in at least one of its constituent components, a reinforced rubber composition according to the invention.

Another subject-matter of the invention is processes for reducing the cold flow of a monofunctional diene elastomer carrying, at just one chain end, a silanol functional group or a polysiloxane block having a silanol end, the other end being devoid of any functionalization.

The expression composition "based on" should be understood as meaning a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

In the present description, unless expressly indicated otherwise, all the percentages (%) indicated are % by weight. Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b).

In the present description, functionalized diene elastomer is understood to mean a diene elastomer which comprises a group comprising one or more heteroatoms.

This group can be located at the chain end. It will then be said that the diene elastomer is functionalized at the chain end. It is generally an elastomer obtained by reaction of a living elastomer with a functionalization agent, that is to say any at least monofunctional molecule, the functional group being any type of chemical group known by a person skilled in the art to react with a living chain end.

This group can be located in the linear main elastomer chain. It will then be said that the diene elastomer is coupled or alternatively functionalized at the chain middle, in contrast to the position "at the chain end", although the group is not located precisely at the middle of the elastomer chain. It is generally an elastomer obtained by reaction of a living elastomer with a coupling agent, that is to say any at least difunctional molecule, the functional group being any type of chemical group known by a person skilled in the art to react with a living chain end.

This group can be central, to which n elastomer chains (n>2) are bonded, forming a star-branched structure of the elastomer. It will then be said that the diene elastomer is star-branched. It is generally an elastomer obtained by reaction of a living elastomer with a star-branching agent, that is to say any multifunctional molecule, the functional group being any type of chemical group known by a person skilled in the art to react with a living chain end.

A first subject-matter of the invention is thus a functionalized diene elastomer, characterized in that it is composed of from 75 to 95% by weight of diene elastomer functionalized at the chain end by a silanol functional group or a polysiloxane block having a silanol end and of from 5 to 25% by weight of diene elastomers coupled by or star-branched by tin. These percentages are to be understood with respect to the total weight of the functionalized diene elastomer.

According to the invention, the functionalized diene elastomer carrying, at the chain end, a silanol functional group or a polysiloxane block having a silanol end is present in the functionalized diene elastomer according to proportions ranging from 75% to 95% by weight of the total weight of the functionalized elastomer, preferably from 75% to 90% by weight, more preferably still from 75% to 85% by weight, for example from 80% to 85% by weight.

Preferably suitable as polysiloxane block having a silanol end are those corresponding to the following general formula:

in which:
R$_1$ and R$_2$, which are identical or different, represent an alkyl, cycloalkyl, aryl, alkaryl, aralkyl or vinyl group having from 1 to 10 carbon atoms, preferably an alkyl group having from 1 to 6 carbon atoms; more preferably still, R$_1$ and R$_2$ each represent a methyl radical;
x is an integer ranging from 1 to 1500 and preferably from 1 to 50; more preferably still, x has the value 1.

According to a preferred alternative form of the invention, the functionalized diene elastomer carrying, at the chain end, a silanol functional group or a polysiloxane block having a silanol end is monofunctional. In other words, according to this alternative form, the diene elastomer is functionalized at just one chain end. The other chain end is free and does not carry any functional group.

According to the invention, the diene elastomer coupled by or star-branched by tin is present in the functionalized elastomer according to an amount of 5% to 25% by weight of the total weight of the functionalized elastomer, preferably ranging from 10% to 25% by weight, more preferably still from 15% to 25% by weight, for example from 15% to 20% by weight. This is because a significant improvement in the behaviour on storage of the functionalized diene elastomer according to the invention is observed for a proportion of at least 5% by weight of diene elastomer coupled by or star-branched by tin. Above 25% by weight of diene elastomer coupled by or star-branched by tin, the cold flow of the elastomer/rubber properties compromise of the rubber composition is put at a disadvantage as a result of the increase in the hysteresis.

According to a preferred alternative form of the invention and for a better cold flow resistance, the diene elastomer is advantageously a diene elastomer star-branched by tin, that is to say that the tin atom is bonded to n elastomer chains (n>2) forming a star-branched structure of the elastomer. More preferably still, four elastomer chains are bonded to the tin, which results in a star-branched elastomer comprising four branches.

Diene elastomer capable of being employed in accordance with the invention is understood as meaning any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms.

The following are suitable in particular as conjugated dienes: 1,3-butadiene, 2-methyl-1,3-butadiene, 2,3-di(C$_1$ to C$_5$ alkoyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene, 2,4-hexadiene, and the like.

The following are suitable in particular as vinylaromatic compounds: styrene, ortho-, meta- or para-methylstyrene, the commercial mixture "vinyltoluene", para-(tert-butyl)styrene, methoxystyrenes, vinylmesitylene, divinylbenzene, vinylnaphthalene, and the like.

The copolymers can comprise between 99% and 20% by weight of diene units and from 1% to 80% by weight of vinylaromatic units.

The functionalized diene elastomer in accordance with the invention is preferably chosen from the group of the highly unsaturated diene elastomers consisting of polybutadienes (BR), synthetic polyisoprenes (IR), butadiene copolymers, isoprene copolymers and the mixtures of these elastomers. Such copolymers are more preferably chosen from butadiene/styrene copolymers (SBR).

The functionalized diene elastomer can have any microstructure which depends on the polymerization conditions used. The elastomer can be a block, random, sequential or microsequential elastomer, and the like, and can be prepared in dispersion or in solution. When an anionic polymerization is involved, the microstructure of these elastomers can be determined by the presence or absence of a modifying and/or randomizing agent and the amounts of modifying and/or randomizing agent employed. The functionalized diene elastomer carrying, at the chain end, a silanol functional group or a polysiloxane block having a silanol end and the diene elastomer coupled by or star-branched by tin can have the same microstructure or a different microstructure.

The following are suitable in particular: polybutadienes having a content (molar %) of 1,2-units of between 4% and 80% or those having a content (molar %) of cis-1,4-units of greater than 80%, polyisoprenes, butadiene/styrene copolymers and in particular those having a Tg (glass transition temperature, measured according to ASTM D3418) between −80° C. and 0° C. and more particularly between −70° C. and −10° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg from −80° C. to −40° C., or isoprene/styrene copolymers, in particular those having a styrene content of between 5% and 50% by weight and a Tg of between −50° C. and 0° C.

In the case of butadiene/styrene/isoprene copolymers, those having a styrene content of between 5% and 50% by weight and more particularly between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/styrene/isoprene copolymer having a Tg of between −70° C. and 0° C., are suitable in particular.

According to the invention, the diene elastomer functionalized at the chain end and the diene elastomer coupled by or star-branched by tin are, before they are functionalized, of the same nature. However, it should be noted that the elastomers which are not identical but which are regarded, in the tyre field, as similar elastomers as a result of comparable technical effects also come within the scope of the invention.

The polymerization of diene monomers is initiated by an initiator. Use may be made, as polymerization initiator, of any known monofunctional anionic initiator. However, an initiator comprising an alkali metal salt, such as lithium, is preferably used.

Among organolithium initiators, those comprising a carbon-lithium bond are suitable in particular. Use will preferably be made of a hydrocarbon organolithium initiator not comprising a heteroatom. Representative compounds are aliphatic organolithium compounds, such as ethyllithium, n-butyllithium (n-BuLi), isobutyllithium, polymethylene dilithium compounds, such as 1,4-dilithiobutane, and the like.

The polymerization is, as known per se, preferably carried out in the presence of an inert solvent which can, for example, be an aliphatic or alicyclic hydrocarbon, such as pentane, hexane, heptane, isooctane or cyclohexane, or an aromatic hydrocarbon, such as benzene, toluene or xylene.

The polymerization can be carried out continuously or batchwise. The polymerization is generally carried out at a temperature of between 20° C. and 120° C. and preferably in the vicinity of 30° C. to 90° C. Of course, it is also possible to add, at the end of polymerization, a transmetallating agent for modifying the reactivity of the living chain end.

The living diene elastomer resulting from the polymerization is subsequently functionalized in order to prepare the functionalized diene elastomer according to the invention.

According to a first alternative form of preparation of the functionalized diene elastomer according to the invention, the diene elastomer functionalized at the chain end by a silanol functional group or a polysiloxane block having a silanol end and the diene elastomer coupled by or star-branched by tin are mixed in the appropriate proportions.

The diene elastomer functionalized at the chain end by a silanol functional group or a polysiloxane block having a silanol end can advantageously be obtained according to the procedures described in Patent Application EP-A-0 778 311, the description of which is incorporated by way of reference.

The diene elastomer coupled by or star-branched by tin can be obtained in a way known per se by reaction of a tin derivative with the living diene elastomer resulting from the polymerization. The preparation of such a star-branched diene elastomer is described, for example, in U.S. Pat. No. 3,393,182.

The mixing of the two elastomers can be carried out in an inert solvent, for example an aliphatic or alicyclic hydrocarbon, such as pentane, hexane, heptane, isooctane or cyclohexane, or an aromatic hydrocarbon, such as benzene, toluene or xylene, which can be the same as the polymerization solvent. The mixing will then be carried out at a temperature between 20° C. and 120° C. and preferably in the vicinity of 30° C. to 90° C.

According to a second alternative form of preparation of the functionalized diene elastomer according to the invention, the living diene elastomer resulting from the polymerization stage is subjected to the reaction of a tin-based coupling or star-branching agent and to that of a functionalization agent capable of introducing, at the polymer chain end, the silanol functional group or the polysiloxane block having a silanol end.

Mention may be made, as functionalization agent capable of introducing, at the polymer chain end, the silanol functional group or the polysiloxane block having a silanol end, of agents of cyclic polysiloxane type in order to obtain an elastomer having an SiO-end, this being done in a medium which does not make possible the polymerization of the said cyclopolysiloxane. Mention may be made, as cyclic polysiloxanes, of those corresponding to the formula:

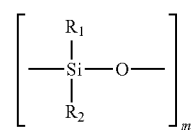

in which:

R$_1$ and R$_2$, which are identical or different, represent an alkyl, cycloalkyl, aryl, alkaryl, aralkyl or vinyl group having from 1 to 10 carbon atoms, m represents an integer with a value from 3 to 8.

Mention may be made, as preferred cyclic polysiloxane compounds, of hexamethylcyclotrisiloxane, trimethyltriethylcyclotrisiloxane, octamethylcyclotetrasiloxane, decamethylcyclopentasiloxane and their mixtures.

Mention may be made, as tin-based coupling or star-branching agents, of tin derivatives of formula $SnR_xX_{4-x}$, x representing an integer with a value from 0 to 2, R representing an alkyl, cycloalkyl, aryl, alkaryl, aralkyl or vinyl radical having from 1 to 10 carbon atoms, preferably an alkyl radical having from 1 to 4 carbon atoms, and X being a halogen atom, preferably chlorine. Mention may be made, as preferred tin derivatives, of dibutyltin dichloride or tin tetrachloride, the latter being very particularly preferred. In the same way, the functionalization can be obtained with a tin-derived functionalization agent which can correspond to the general formula $(X^1{}_1R^1{}_2Sn)$—O—$(SnR^1{}_{3-y}X^1{}_y)$ or $(X^1{}_1R^1{}_2Sn)$—O—$(CH_2)_n$—O—$(SnR^1{}_{3-y}X^1{}_y)$, where y represents an integer with the value 0 or 1, R$^1$ represents an alkyl, cycloalkyl, aryl, alkaryl or vinyl radical having from 1 to 12 carbon atoms, preferably a butyl, X$^1$ is a halogen atom, preferably chlorine, and n represents an integer from 1 to 20, preferably 4.

Thus, for example, the functionalization of the living diene elastomer resulting from the polymerization stage can be carried out at a temperature varying from 30 to 120° C., in the presence, in a first step, of an appropriate amount of a tin-based agent, in order to star-branch or couple from 5% to 25% by weight of the living diene elastomer. Then, in a second step, the remaining living chains of the diene elastomer obtained after the first stage are functionalized by addition of a functionalization agent capable of introducing, at the polymer chain end, the silanol functional group or the polysiloxane block having a silanol end and reaction with this agent. The functionalization reaction of the diene elastomer is subsequently halted by the deactivation of the remaining living chains and by reaction of the SiO— chain ends with a proton-donating compound, to result in the functionalized diene elastomer according to the invention.

The functionalized diene elastomer in accordance with the invention exhibits an improved cold flow resistance, which brings about better behaviour during the storage and transportation of this rubber.

The functionalized diene elastomer in accordance with the invention can advantageously be used in a rubber composition reinforced by at least one inorganic filler, such as silica, of which it maintains the dynamic and processing properties at a level satisfactory for application in tyres. This rubber composition also forms the subject-matter of the invention.

According to the invention, the rubber composition is based on at least one reinforcing filler comprising an inorganic filler and on an elastomer matrix comprising the functionalized diene elastomer described above.

The functionalized diene elastomer in accordance with the invention is present in the rubber composition in proportions ranging from 10 to 100 phr (parts by weight per hundred parts by weight of elastomer).

According to an alternative form of the invention, the functionalized diene elastomer is present in the elastomer matrix in a predominant fraction by weight. In the context of the invention, predominant fraction by weight is understood to mean the greatest fraction by weight of the matrix, preferably a fraction by weight of at least 50%. The fraction by weight is understood with respect to the total weight of the elastomer matrix. The functionalized diene elastomer according to the invention is then present in the elastomer matrix according to an amount ranging from 50 to 100 phr, preferably from 60 to 100 phr.

The elastomer matrix can also comprise, in addition to the functionalized diene elastomer defined above, at least one diene elastomer conventionally used in tyres, such as natural rubber or a synthetic elastomer, or also another coupled or star-branched functionalized diene elastomer. This or these other diene elastomers are present in the matrix in proportions ranging from 0 to 90 phr, indeed even, according to the above alternative form, in proportions ranging from 0 to 50 phr.

The rubber composition according to the invention comprises, in addition to the elastomer matrix, at least one reinforcing filler comprising an inorganic filler. The term "inorganic filler" should be understood in the present patent application, by definition, as meaning any inorganic or mineral filler, whatever its colour or its origin (natural or synthetic), also known as "white filler", "clear filler", indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface. The term "inorganic filler" is also understood to mean any mixture of these fillers.

Preferably, the reinforcing inorganic filler is, completely or at the very least predominantly, silica ($SiO_2$). The silica used can be any reinforcing silica known to a person skilled in the art, in particular any precipitated or pyrogenic silica exhibiting a BET specific surface and a CTAB specific surface both of less than 450 m$^2$/g, even if highly dispersible precipitated silicas are preferred. Mention will also be made, as reinforcing inorganic filler, of mineral fillers of the aluminous type, in particular alumina ($Al_2O_3$) or aluminium (oxide) hydroxides, or also reinforcing titanium oxides.

The physical state under which the reinforcing inorganic filler is provided is immaterial, whether in the powder, microbead, granule or bead form. Of course, reinforcing inorganic filler is also understood to mean mixtures of different reinforcing inorganic fillers, in particular of highly dispersible silicas as described above.

It should be noted that the reinforcing inorganic filler can be blended (mixed) with an organic filler, such as carbon black, thus constituting the reinforcing filler of the composition according to the invention.

According to a preferred implementation of the invention, this reinforcing filler is predominantly composed of the reinforcing inorganic filler, that is to say that the proportion of inorganic filler is greater than 50% by weight of the total weight of the filler, the maximum being 100%. Preferably, the reinforcing filler is composed of 70% to 100% by weight of the inorganic filler.

All carbon blacks, in particular blacks of the HAF, ISAF, SAF, FF, FEF, GPF and SRF types, conventionally used in tyre rubber compositions ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, but also coarser blacks, such as, for example, the N550 or N683 blacks. The carbon blacks might, for example, be already incorporated in the rubber in the form of a masterbatch.

Mention may be made, as examples of organic fillers other than carbon blacks, of functionalized polyvinylaromatic organic fillers, such as described in Applications WO-A-2006/069792 and WO-A-2006/069793, or also of functionalized nonaromatic polyvinyl organic fillers, such as described in Applications WO-A-2008/003434 and WO-A-2008/003435.

In the case where the reinforcing filler comprises a reinforcing inorganic filler and carbon black, the fraction by weight of this carbon black in the said reinforcing filler is preferably chosen to be less than or equal to 30%, with respect to the total weight of the reinforcing filler, more preferably less than 20%.

The person skilled in the art will understand that use might be made, as filler equivalent to the reinforcing inorganic filler described in the present section, of a reinforcing filler of another nature, in particular organic nature, provided that this reinforcing filler is partially or completely covered with an inorganic layer, such as silica, or else comprises, at its surface, functional sites, in particular hydroxyl sites, requiring the use of a coupling agent in order to establish the bond between the filler and the elastomer. Carbon blacks modified via silica, such as, without implied limitation, the fillers which are sold by Cabot under the name "CRX 2000", and which are described in the international patent document WO-A-96/37547, are also suitable.

Advantageously, the composition according to the invention comprises from 35 to 200 phr of reinforcing filler. Preferably, the content of reinforcing filler is between 40 and 140 phr, more preferably between 50 and 130 phr, the optimum differing, in a known way, according to the specific applications targeted; in particular in tyres, the expected level of reinforcement with regard to a bicycle tyre, for example, is, of course, lower than that required with regard to a tyre capable of running at high speed in a sustained manner, for example a motorcycle tyre, a tyre for a passenger vehicle or a tyre for a utility vehicle, such as a heavy-duty vehicle.

Use is made, in a known way, in order to couple the reinforcing inorganic filler to the diene elastomer, of an at least bifunctional coupling agent (or bonding agent) intended to provide a satisfactory connection, of chemical and/or physical nature, between the inorganic filler and the diene elastomer, in particular bifunctional organosilanes or polyorganosiloxanes.

Use is made in particular of silane polysulphides, known as "symmetrical" or "unsymmetrical" according to their specific structure, such as described, for example, in Applications WO03/002648 (or US 2005/016651) and WO03/002649 (or US 2005/016650).

Silane polysulphides known as "symmetrical", corresponding to the following general formula (I):

$$Z\text{-}A'\text{-}S_x\text{-}A'\text{-}Z, \tag{I}$$

in which:

x is an integer from 2 to 8 (preferably from 2 to 5);

A' is a divalent hydrocarbon radical (preferably $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the following formulae:

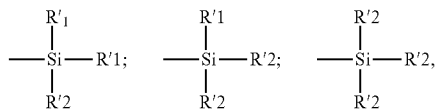

in which:
the R'1 radicals, which are substituted or unsubstituted and which are identical to or different from one another, represent a $C_1$-$C_{18}$ alkyl group, a $C_5$-$C_{18}$ cycloalkyl group or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl),
the R'2 radicals, which are substituted or unsubstituted and which are identical to or different from one another, represent a $C_1$-$C_{18}$ alkoxyl group or a $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl),
are particularly suitable, without the above definition being limiting.

Mention will more particularly be made, as examples of silane polysulphides, of bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, or bis(3-triethoxysilylpropyl) disulphide, abbreviated to TESPD. Mention will also be made, as preferred examples, of bis(mono ($C_1$-$C_4$) alkoxydi ($C_1$-$C_4$) alkylsilylpropyl) polysulphides (in particular disulphides, trisulphides or tetrasulphides), more particularly bis(monoethoxydimethylsilylpropyl) tetrasulphide, as described in Patent Application WO 02/083782 (or US 2004/132880).

Mention will in particular be made, as coupling agent other than alkoxysilane polysulphide, of bifunctional POSs (polyorganosiloxanes), or of hydroxysilane polysulphides, such as described in Patent Applications WO 02/30939 (or U.S. Pat. No. 6,774,255) and WO 02/31041 (or US 2004/051210), or of silanes or POSs carrying azodicarbonyl functional groups, such as described, for example, in Patent Applications WO 2006/125532, WO 2006/125533 and WO 2006/125534.

In the compositions in accordance with the invention, the content of coupling agent is advantageously less than 20 phr, it being understood that it is generally desirable to use as little as possible thereof. The content thereof is preferably between 0.5 and 12 phr, more preferably from 3 to 10 phr. Typically, the content of coupling agent represents at least 0.5% and at most 15% by weight, with respect to the amount of inorganic filler, preferably at most 12% and more particularly at most 10%.

The rubber compositions in accordance with the invention can also comprise, in addition to coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their processability in the raw state.

The rubber compositions in accordance with the invention can also comprise all or a portion of the usual additives generally used in elastomer compositions intended for the manufacture of tyres, such as, for example, pigments, non-reinforcing fillers, protection agents, such as antiozone waxes, chemical antiozonants or antioxidants, antifatigue agents, plasticizing agents, reinforcing or plasticizing resins, methylene acceptors (for example, phenolic novolak resin) or methylene donors (for example, HMT or H3M), such as described, for example, in Application WO 02/10269, a crosslinking system based either on sulphur or on sulphur donors and/or on peroxide and/or on bismaleimides, vulcanization accelerators or vulcanization activators.

The compositions of the invention can also comprise, as nonaromatic or very slightly aromatic preferred plasticizing agent, at least one compound chosen from the group consisting of naphthenic oils, paraffinic oils, MES oils, TDAE oils, ester plasticizers (for example, glycerol trioleates), hydrocarbon resins exhibiting a high Tg, preferably at greater than 30° C., such as described, for example, in Applications WO 2005/087859, WO 2006/061064 and WO 2007/017060, and the mixtures of such compounds. The overall content of plasticizing agent is preferably at least 10 and at most 100 phr, more preferably at most 80 phr, indeed even at most 70 phr. According to another preferred aspect, the composition comprises a plasticizing system composed of at least one MES or TDAE oil and of at least one resin exhibiting a high Tg, each of the components being present, for example, in amounts ranging from 5 to 35 phr.

The rubber composition in accordance with the invention can be prepared according to a process which comprises at least the following stages:
(i) carrying out, at a maximum temperature of between 130° C. and 200° C., a first step of thermomechanical working (sometimes described as "nonproductive" phase) of the necessary base constituents of the said composition comprising the elastomer matrix and a reinforcing filler, with the exception of the crosslinking system, then
(ii) carrying out, at a temperature lower than the said maximum temperature of the said first step, preferably of less than 120° C., a second step of mechanical working during which the said crosslinking system is incorporated.

The rubber composition thus obtained can subsequently advantageously be extruded or calendered in a way known per se in the form desired, in order to manufacture semifinished products, such as treads.

This process can also comprise, prior to carrying out the abovementioned stages (i) and (ii), the stages of the preparation of the elastomer matrix and more particularly those of the preparation of the functionalized diene elastomer according to the invention.

Another subject-matter of the invention is a tyre which incorporates, in at least one of its constituent components, a reinforced rubber composition according to the invention and a subject-matter of the invention is more particularly semifinished articles of a tyre which comprise this composition.

Due to the cold flow resistance which characterizes the functionalized diene elastomer according to the invention, it should be noted that the storage and the transportation of this elastomer are substantially improved with respect to a non-star-branched elastomer.

In addition, due to a good compromise in rubber properties and more particularly to a satisfactory processing and a satisfactory hysteresis, it is understood that the use of the rubber composition comprising the functionalized diene elastomer according to the invention in the manufacture of a tread provides the tyre comprising it with a suitable level of rolling resistance. A subject-matter of the invention is thus more particularly a tyre tread which is such that it comprises a reinforced rubber composition according to the invention or else which is such that it is exclusively composed of this composition.

Another subject-matter of the invention is a process for reducing the cold flow of a monofunctional diene elastomer carrying, at just one chain end, a silanol functional group or a polysiloxane block having a silanol end, the other end being devoid of any functionalization. This process consists, prior to the conditioning of the elastomer, in modifying it by addition of a diene elastomer coupled by or star-branched by tin in a proportion of from 5 to 35% by weight, with respect to the weight of the monofunctional diene elastomer, so as to obtain a functionalized diene elastomer, from 75% to 95% by weight of which carries, at just one chain end, a silanol functional group or a polysiloxane block having a silanol end, the other end being devoid of any functionalization, and from 5% to 25% by weight of which is coupled by or star-branched by tin.

Another subject-matter of the invention is a process for reducing the cold flow of a monofunctional diene elastomer carrying, at just one chain end, a silanol functional group or a polysiloxane block having a silanol end, the other end being devoid of any functionalization. This process consists, during the synthesis of the diene elastomer, on conclusion of the polymerization stage, in carrying out a coupling or a star-branching of 5 to 25% by weight of the living elastomer with a tin-based compound and in then functionalizing the 75 to 95% by weight of remaining living elastomer with a functionalization agent capable of introducing the silanol functional group or the polysiloxane block having a silanol end.

The abovementioned characteristics of the present invention, and others, will be better understood on reading the following description of several implementational examples of the invention, given by way of illustration and without implied limitation.

EXAMPLES

I Preparation of an elastomer matrix according to the invention
1) Measurements and Tests Used—Experimental Techniques Used for the Precuring Characterization of the Polymers Obtained:
(a) Determination of the distribution in molar masses by the steric exclusion chromatography technique (conventional SEC)

The SEC (size exclusion chromatography) technique was used to determine the distributions in molecular weights relative to samples of these polymers. This technique has made it possible, starting from standard products having the characteristics described in Example 1 of the document of European Patent EP-A-692 493, to evaluate, for a sample, a number-average molecular weight (Mn) which has a relative value, unlike that determined by osmometry, and also a weight-average molecular weight (Mw). The polydispersity index (PI=Mw/Mn) of this sample, calculated via a "Moore" calibration, was subsequently "deduced".

According to this technique, the macromolecules are separated physically, according to their respective sizes in the swollen state, in columns filled with a porous stationary phase. Before carrying out this separation, the sample of polymer is dissolved in tetrahydrofuran at a concentration of approximately 1 g/l. The solution is then filtered through a filter with a porosity of 0.45 µm before injection.

A chromatograph sold under the name "Waters Alliance 2690", equipped with an in-line degasser, is used for the abovementioned separation. The elution solvent is tetrahydrofuran, the flow rate is 1 ml/min, the temperature of the system is 35° C. and the analysis time is 30 min. Use is made of a set of two "Waters" columns, "Styragel HT6E" type, arranged in series.

| Number | Brand | Range of molar masses (g/mol) | Length (mm) | Internal diameter (mm) | Size of the particles (μm) | Trade name | References (by way of indication) |
|---|---|---|---|---|---|---|---|
| Column 1 | Waters | 2000-10$^7$ | 300 | 7.8 | 10 | Styragel HT6E | WAT044219 |
| Column 2 | Waters | 2000-10$^7$ | 300 | 7.8 | 10 | Styragel HT6E | WAT044219 |

The injected volume of the polymer sample solution is 100 μl. The detector is a "Waters" model "2410" differential refractometer. Use is made of systems software for the chromatographic data having the trade name "Waters Empower".

The calculated average molar masses are relative to a calibration curve produced for SBRs with the following microstructure: 25% by weight of units of styrene type, 23% by weight of units of 1,2-type and 50% by weight of units of trans-1,4-type.

(b) For the polymers and rubber compositions, the Mooney viscosities ML (1+4) at 100° C. are measured according to Standard ASTM D-1646.

Use is made of an oscillating consistometer as described in Standard ASTM D-1646. The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 N.m).

(c) The glass transition temperatures Tg of the polymers are measured using a differential scanning calorimeter.

(d) The CH$_3$Si(SBR)$_2$OH functionalization in the middle of the chain or the SBR(CH$_3$)$_2$SiOH functionalization at the chain end is characterized by 2D $^1$H-$^{29}$Si NMR and quantified by $^1$H NMR.

The 2D $^1$H-$^{29}$Si NMR spectrum makes it possible to confirm the nature of the functional group by virtue of the chemical shift values of the silicon nuclei and of the protons in the $^2$J vicinity (via two bonds). It uses a $^2$J$_{1H-29Si}$ coupling constant value of 8 Hz. The chemical shift of the silicon of the entity SBR(CH$_3$)$_2$SiOH at the chain end is approximately 11-12 ppm.

The $^1$H NMR spectrum makes it possible to quantify the functional group by integration of the signal characteristic of the protons of the methyl group carried by the silicon CH$_3$Si, situated in the vicinity of δ=0 ppm. The samples are dissolved in carbon disulphide (CS$_2$). 100 μL of deuterated cyclohexane (C$_6$D$_{12}$) are added for the lock signal. The NMR analyses are carried out on a 500 MHz Bruker spectrometer equipped with a 5 mm "broad band" BBI probe. For the quantitative $^1$H NMR experiment, the sequence uses a 30° pulse and a repetition time of 2 seconds.

(e) The $^{13}$C NMR technique (Beebe, D. H., *Polymer*, 1978, 19, 231-33, or Bradbury, J. H., Elix, J. A. and Perera, M. C. S., *Journal of Polymer Science*, 1988, 26, 615-26) is used to determine the microstructure of the elastomers obtained. The $^{13}$C NMR analyses are carried out on a 250 MHz Bruker spectrometer equipped with a 10 mm $^{13}$C-$^1$H dual probe. The elastomer is dissolved in CDCl$_3$ at a concentration of approximately 75 g/l. The quantitative $^{13}$C NMR experiment uses a sequence with $^1$H decoupling and suppression of the Overhauser effect (inverse gated $^1$H-decoupling), a 90° pulse and a repetition time=6 s. The spectral width is 200 ppm and the number of scans is 8192. The spectra are calibrated on the central peak of the triplet of the CDCl$_3$ at 77 ppm.

(f) For the polymers, the intrinsic viscosity at 25° C. of a 0.1 g/dl solution of polymer in toluene is measured starting from a solution of dry polymer:

Principle:

The intrinsic viscosity is determined by the measurement of the flow time t of the polymer solution and of the flow time t$_o$ of the toluene in a capillary tube.

The flow time of the toluene and the flow time of the 0.1 g/dl polymer solution are measured in a Ubbelohde tube (diameter of the capillary 0.46 mm, capacity from 18 to 22 ml) placed in a bath thermostatically controlled at 25±0.1° C.

The intrinsic viscosity is obtained by the following relationship:

$$\eta_{int} = \frac{1}{C} \ln\left[\frac{(t)}{(t_o)}\right]$$

with:
C: concentration of the toluene solution of polymer in g/dl;
t: flow time of the toluene solution of polymer in seconds;
t$_o$: flow time of the toluene in seconds;
η$_{int}$: intrinsic viscosity, expressed in dl/g.

(g) For the polymers, the cold flow: CF100(1+6), results from the following measurement method:

It is a matter of measuring the weight of rubber extruded through a calibrated die over a given time (6 hours), under fixed conditions (at 100° C.). The die has a diameter of 6.35 mm for a thickness of 0.5 mm.

The cold flow apparatus is a cylindrical cup pierced at the base. Approximately 40 g±4 g of rubber, preprepared in the form of a pellet (thickness of 2 cm and diameter of 52 mm), are placed in this device. A calibrated piston weighing 1 kg (±5 g) is positioned on the rubber pellet. The assembly is subsequently placed in an oven thermally stabilized at 100° C.±0.5° C.

During the first hour in the oven, the measurement conditions are not stabilized. After one hour, the product which has extruded is thus cut off and discarded.

The measurement subsequently lasts 6 hours±5 min, during which the product is left in the oven. At the end of the 6 hours, the extruded product sample has to be recovered by cutting it flush with the surface of the base. The result of the test is the weight of rubber, weighed in grams.

2) Preparation of a Copolymer a Functionalized with SiOH at the Chain End

Cyclohexane, butadiene, styrene and tetrahydrofurfuryl ethyl ether are introduced continuously, according to respective flow rates by weight of 100/11/3.2/0.037, into a 32.5 l reactor equipped with a stirrer of turbine type. 200 micromol of n-butyllithium (n-BuLi) per 100 g of monomers are introduced at the line inlet in order to neutralize the protic impurities introduced by the various constituents present in the line inlet. 530 µmol of n-BuLi per 100 g of monomers are introduced at the inlet of the reactor.

The various flow rates are adjusted so that the mean residence time in the reactor is 40 min. The temperature is maintained at 80° C.

The degree of conversion, which is measured on a sample withdrawn at the reactor outlet, is 98%.

Finally, at the reactor outlet, 265 micromol of hexamethylcyclotrisiloxane, in solution in cyclohexane, per 100 g of monomers are added to the living polymer solution (on an in-line static mixer). The copolymer is then subjected to an antioxidizing treatment using 0.8 phr of 2,2'-methylenebis (4-methyl-6-(tert-butyl)phenol and 0.2 phr of N-(1,3-dimethylbutyl)-N'-phenyl-p-phenylenediamine.

The copolymer thus treated is separated from its solution by a steam stripping operation and is then dried on an open mill at 100° C. for 20 min, in order to obtain the copolymer functionalized with SiOH at the chain end.

The ML viscosity of this copolymer A is 53. The molecular weight of the copolymer, determined by conventional SEC, is 123 000 g/mol and the PI is 2.0.

The microstructure of this copolymer A is determined by $^{13}C$ NMR.

The SBR block of this copolymer A comprises 25% of styrene (by weight) and, for its butadiene part, 58% of vinyl units, 21% of cis-1,4-units and 21% of trans-1,4-units.

The 2D $^1H$-$^{29}Si$ NMR analysis allows it to be concluded that there exists a chain-end functional group SER(CH$_3$)$_2$SiOH. The content of (CH$_3$)$_2$Si functional groups, determined by $^1H$ NMR, for the copolymer A is 5.85 mmol/kg.

3) Preparation of a Copolymer B Star-Branched by Tin:

The synthesis of the copolymer B is carried out according to the operating conditions described in Test 1, except that tin tetrachloride is added in place of the hexamethylcyclotrisiloxane, 265 micromol of tin tetrachloride in solution in cyclohexane per 100 g of monomers.

The ML viscosity of the copolymer B is 104. The molecular weight of the copolymer, determined by conventional SEC, is 209 000 g/mol and the PI is 2.1.

The microstructure of this copolymer B is determined by $^{13}C$ NMR.

The SBR block of this copolymer B comprises 25% of styrene (by weight) and, for its butadiene part, 58% of vinyl units, 21% of cis-1,4-units and 21% of trans-1,4-units.

4) Preparation of Elastomer Matrices, Mixtures of the Copolymer A and Copolymer B:

5 kg of cyclohexane, 285 g of polymer A and 15 g of polymer B are added to a 10 litre reactor and this mixture is placed at 60° C. for 5 hours. The copolymer thus treated is separated from its solution by a steam stripping operation and is then dried on an open mill at 100° C. for 20 min, in order to obtain the copolymer C.

| Copolymer | Copolymer A (g) | Copolymer B (g) | Mn SEC | PI | Cold flow |
|---|---|---|---|---|---|
| C | 285 | 15 | 119 000 | 2.0 | 1.83 |
| D | 270 | 30 | 119 000 | 2.1 | 1.40 |
| E | 240 | 60 | 125 000 | 2.0 | 0.84 |
| F | 210 | 90 | 129 000 | 2.1 | 0.41 |

II Comparative examples of rubber compositions

1) Measurements and tests used (h) The Mooney viscosity ML (large) and MS (small) (1+4) at 100° C.: measured according to Standard ASTM: D-1646, entitled "Mooney" in the tables. The results are in relative data: an increase with respect to the control at 100 indicates an increase in the viscosity and thus a detrimentally affected processing.

(i) The Shore A hardness: measurements carried out according to Standard DIN 53505. The results are in relative data: an increase with respect to the control at 100 indicates an increased stiffness.

(j) The dynamic properties ΔG* and tan(δ)max are measured on a viscosity analyser (Metravib VA4000) according to Standard ASTM D 5992-96. The response of a sample of vulcanized composition (cylindrical test specimen with a thickness of 2 mm and with a cross section of 79 mm$^2$), subjected to a simple alternating sinusoidal shear stress, at a frequency of 10 Hz, under the standard temperature conditions (23° C.) according to Standard ASTM D 1349-99, is recorded. A peak-to-peak strain amplitude sweep is carried out from 0.1% to 50% (outward cycle) and then from 50% to 0.1% (return cycle). The results made use of are the complex dynamic shear modulus (G*) and the loss factor tan δ. The maximum value of tan δ observed (tan(δ)max), and the difference in complex modulus (ΔG*) between the values at 0.1% and 50% strain (Payne effect), are shown for the return cycle. The results are in relative data: an increase with respect to the control at 100 indicates an increase in the hysteresis.

Example 1

Tg=−25° C.

The elastomers SBR C, SBR D, SBR E and SBR F were used for the preparation of rubber compositions C, D, E and F of tread type, each comprising silica as reinforcing filler.

Each of these compositions C, D, E and F exhibits the following formulation (expressed as phr: parts per hundred parts of elastomer):

| | |
|---|---|
| BR (1) | 23 |
| SBR | 77 |
| Silica (2) | 85 |
| Carbon black (3) | 4 |
| Plasticizer (4) | 12 |
| Plasticizer (5) | 18 |
| Silane (6) | 6.8 |
| Stearic acid | 2 |
| DPG (7) | 1.6 |
| Antiozone wax | 1.5 |
| ZnO | 1.5 |
| 6PPD (8) | 1.9 |

-continued

| | |
|---|---|
| Sulphur | 1.2 |
| Accelerator | 1.9 |

(1) = BR with 4.3% of 1, 2 units; 2.7% of trans-1,4-units; 93% of cis-1,4-units (Tg = −106° C.)
(2) = "Zeosil 1165 MP" silica from Rhodia
(3) = N234
(4) = MES oil ("Catenex SNR" from Shell)
(5) = polylimonene resin ("Dercolyte L120" from DRT)
(6) = TESPT coupling agent ("Si69" from Degussa)
(7) = diphenylguanidine ("Perkacit DPG" from Flexsys)
(8) = N-(1,3-dimethylbutyl)-N-phenyl-para-phenylenediamine ("Santoflex 6-PPD" from Flexsys)
(9) = CBS ("Santocure" from Flexsys)

Each of the following compositions is produced, in a first step, by thermomechanical working and then, in a second finishing step, by mechanical working.

The following are successively introduced into a laboratory internal mixer of 'Banbury' type, the capacity of which is 400 cm³, which is 70% filled and which has a starting temperature of approximately 90° C.: the elastomer, two thirds of the silica, the black, the coupling agent and the diphenylguanidine, then, approximately one minute later, the remainder of the reinforcing filler, the MES oil, the resin, the antioxidant, the stearic acid and the antiozone wax and then, approximately two minutes later, the zinc oxide.

The stage of thermomechanical working is carried out for 4 to 5 minutes, up to a maximum dropping temperature of approximately 160° C.

The first abovementioned step of thermomechanical working is thus carried out, it being specified that the mean speed of the blades during this first step is 50 rev/min.

The mixture thus obtained is recovered and cooled and then, in an external mixer (homofinisher), the sulphur and the accelerator are added at 30° C., the combined mixture being further mixed for a time of 3 to 4 minutes (second abovementioned step of mechanical working).

The compositions thus obtained are subsequently calendered, either in the form of plaques (with a thickness ranging from 2 to 3 mm) or fine sheets of rubber, for the measurement of their physical or mechanical properties, or in the form of profiled elements which can be used directly, after cutting and/or assembling to the desired dimensions, for example as semifinished products for tyres, in particular for treads.

The crosslinking is carried out at 150° C. for 40 min.

TABLE 1

| Composition (% star branching) | A (0%) | C (5%) | D (10%) | E (20%) | F (30%) |
|---|---|---|---|---|---|
| Elastomer | SBR A | SBR C | SBR D | SBR E | SBR F |
| ML 1 + 4 at 100° C. elastomer | 50 | 53 | 53 | 56 | 59 |
| Cold flow elastomer | 2.17 | 1.83 | 1.4 | 0.84 | 0.41 |
| Properties in the noncrosslinked state | | | | | |
| ML (1 + 4) at 100° C. | 100 | 99 | 105 | 104 | 101 |
| Properties in the crosslinked state | | | | | |
| Shore A | 100 | 103 | 106 | 104 | 102 |
| Dynamic properties as a function of the strain | | | | | |
| tan(δ)max at 23° C. | 100 | 105 | 105 | 106 | 107 |

It is found that the cold flow resistance of the functionalized diene elastomer is significantly improved by increasing the content of copolymer star-branched by tin in the rubber composition, with respect to composition A in which it is not present. In addition, it is found, for the compositions C, D and E, that tan(δ)max is maintained at acceptable values, despite the increase in the content of copolymer star-branched by tin at the expense of the copolymer functionalized at the chain end by a silanol functional group.

The cold flow of the elastomers—hysteresis of the composition compromise is entirely satisfactory for the compositions C, D and E according to the invention respectively comprising, in their elastomer matrix, 5%, 10% and 20% of a copolymer star-branched by tin.

The invention claimed is:

1. A diene elastomer, wherein:
from 75% to 95% by weight of the diene elastomer is monofunctional and carries, at just one chain end, a silanol functional group or a polysiloxane block having a silanol end, the other end being devoid of any functionalization, and
from 5% to 25% by weight of the diene elastomer is coupled by or star-branched by tin.

2. The elastomer according to claim 1, wherein the polysiloxane block having a silanol end corresponds to the formula:

wherein:
$R_1$ and $R_2$, which are identical or different, represent an alkyl, cycloalkyl, aryl, alkaryl, aralkyl or vinyl group having from 1 to 10 carbon atoms, and
x is an integer ranging from 1 to 1500.

3. The elastomer according to claim 2, wherein $R_1$ and $R_2$, which are identical or different, represent an alkyl group having from 1 to 5 carbon atoms.

4. The elastomer according to claim 1, wherein 10% to 25% by weight of the diene elastomer is the diene elastomer coupled by or star-branched by tin.

5. The elastomer according to claim 1, wherein the diene elastomer coupled by or star-branched by tin is an elastomer star-branched by tin.

6. The elastomer according to claim 5, wherein the diene elastomer star-branched by tin is an elastomer comprising four branches.

7. The elastomer according to claim 1, wherein the diene elastomer is a butadiene/styrene copolymer.

8. An elastomer rubber composition based on at least one reinforcing filler comprising an inorganic filler and on an elastomer matrix, wherein the elastomer matrix comprises at least one diene elastomer according to claim 1.

9. The composition according to claim 8, wherein the elastomer matrix further comprises at least one conventional diene elastomer.

10. The composition according to claim 8, wherein the proportion of inorganic filler in the reinforcing filler is greater than 50% by weight, with respect to the total weight of the reinforcing filler.

11. The composition according to claim 8, wherein the reinforcing inorganic filler is composed of silica.

12. A semifinished article made of rubber for tires, comprising:
a crosslinkable or crosslinked rubber composition according to claim 8.

13. A semifinished article according to claim 12, wherein said article is a tread.

14. A tire comprising: a semifinished article according to claim 12.

15. A process for reducing the cold flow of a monofunctional diene elastomer carrying, at just one chain end, a silanol functional group or a polysiloxane block having a silanol end, the other end being devoid of any functionalization, comprising, prior to its conditioning, modifying the monofunctional diene elastomer by adding a diene elastomer coupled by or star-branched by tin in a proportion of from 5 to 35% by weight, with respect to the weight of the monofunctional diene elastomer.

16. A process for reducing the cold flow of a monofunctional diene elastomer carrying, at just one chain end, a silanol functional group or a polysiloxane block having a silanol end, the other end being devoid of any functionalization, comprising:
  on conclusion of polymerization of a diene elastomer, coupling or star-branching from 5 to 25% by weight of the living elastomer by a tin-based compound, and then functionalizing the 75 to 95% by weight of a remaining living elastomer with a functionalization agent capable of introducing the silanol functional group or the polysiloxane block having a silanol end.

* * * * *